Dec. 8, 1942.  A. SIMONS  2,304,482
CORE DRILL BIT
Filed Nov. 27, 1939
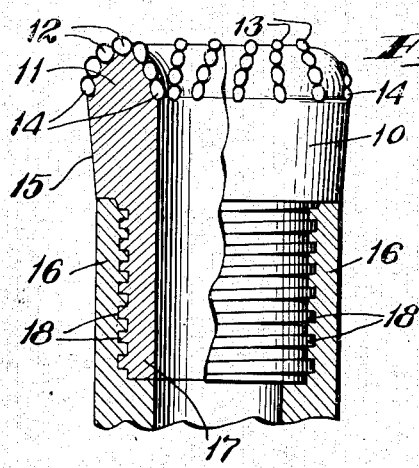
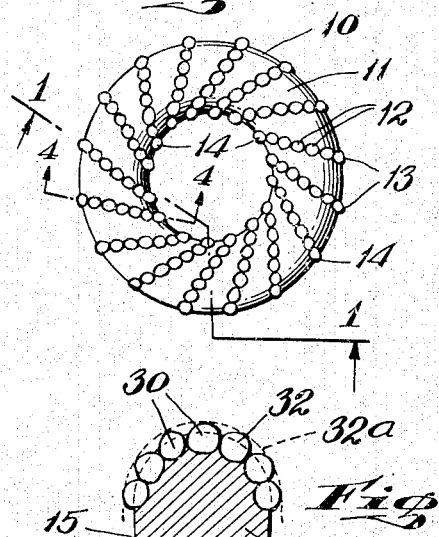
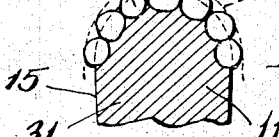
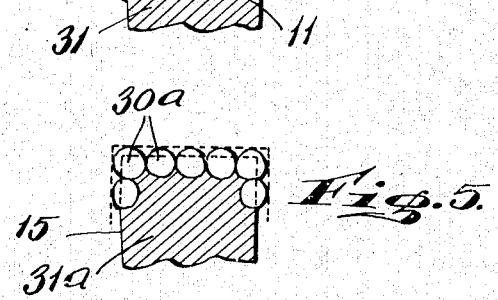
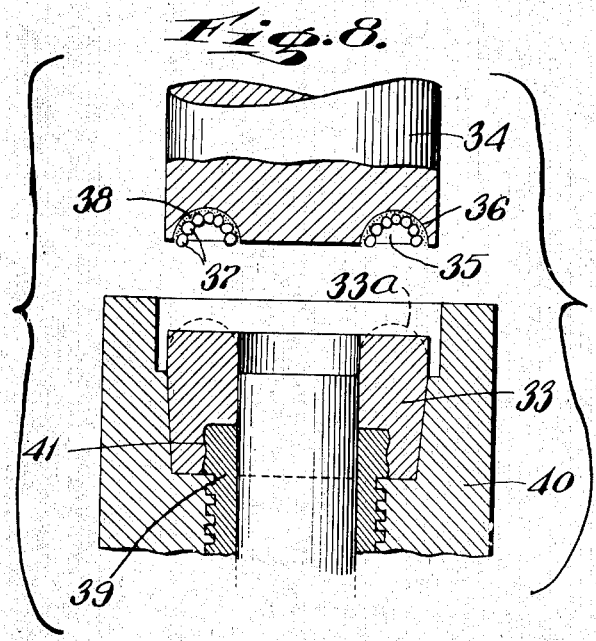
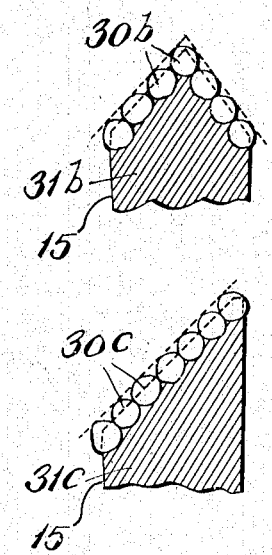
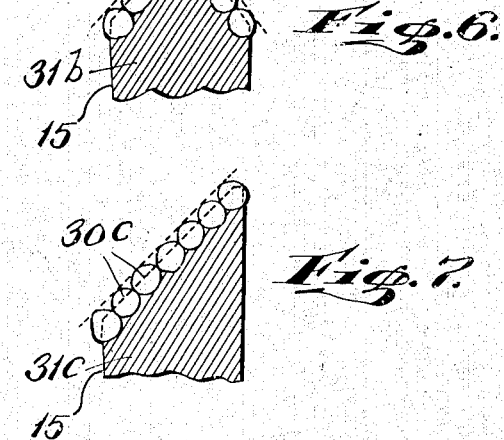
INVENTOR.
AARON SIMONS
BY
Howard E. Thompson
ATTORNEY.

Patented Dec. 8, 1942

2,304,482

UNITED STATES PATENT OFFICE 2,304,482

CORE DRILL BIT

Aaron Simons, Bronx, N. Y.

Application November 27, 1939, Serial No. 306,224

1 Claim. (Cl. 255—72)

This invention relates to core bits and similar tools or other mounting members wherein diamonds or small particles of other extremely hard substances are mounted in the surface of the mounting member to expose parts of the diamonds or other element through said surface. More particularly the invention consists in a tool or member of the character described wherein a series of elements are arranged in contiguous arrangement or in edge to edge and abutting relationship on the surface of the tool and in a predetermined arrangement thereon to provide of the series of elements, substantially continuous cutter blades extending over the surface of the tool body or member. The novel features of the invention will be best understood from the following description when taken together with the accompanying drawing, in which certain embodiments of the invention are disclosed, and in which the separate parts are designated by suitable reference characters in each of the views, and in which:

Fig. 1 is a side and sectional view of a core drill bit made according to my invention, the section being substantially on the line 1—1 of Fig. 2.

Fig. 2 is a plan view of the core drill bit as seen in Fig. 1.

Fig. 3 is a side and sectional view similar to Fig. 1, but showing the use of a separate ring or crown mounted on a threaded shank.

Fig. 4 is an enlarged sectional detail view illustrating the mounting of a row of diamonds, the section being on the line 4—4 of Fig. 2.

Fig. 5 is an enlarged sectional detail view similar to Fig. 4 but showing a modification.

Fig. 6 is a view similar to Fig. 4 but showing another modification.

Fig. 7 is a view similar to Fig. 4 showing a further modification; and

Fig. 8 is a partial sectional view of a workpiece and forming die illustrating the method of producing resulting tools as shown in the other figures.

In the conventional diamond core drill bit, the diamonds are set at random or are arranged in concentric rings, or in staggered concentric rings, so that the diamonds in each ring are staggered with relation to the diamonds in the other rings, or else are arranged in other disposition, but in all cases the diamonds are separated from each other by substantial spacings. Each diamond acts as a separate cutting tooth but the arrangement seldom results in a smooth or uniform cut, but on the contrary, the cut surface of the substance being drilled is somewhat ridged because the diamonds do not all overlap and do not present a continuous cutting edge, but leave some spaces that are not acted upon by any diamond.

In drilling with a conventional diamond core drill bit having random or staggered diamonds, the sludge flows around and between the diamonds, and being abrasive, tends to erode the metal around each diamond, thereby loosening the diamonds from their mountings. In a diamond core drill bit constructed in accordance with my invention, the sludge will impinge upon the leading side of each row of diamonds. The rows are arranged at such suitable angle as to cause the impinging sludge to be deflected outwardly. The erosive action of the sludge, therefore, will be communicated only to the leading side of each diamond and not to its other sides, so that the diamonds will have much less tendency to be loosened from their mountings, thereby greatly adding to the life of the drill bit.

Originally each diamond in a diamond core drill bit was individually mounted by hand, involving considerable expense and requiring large diamonds permitting only a few diamonds to be set in each bit. Lately mechanically set bits have come into wide use. These can be made with a large number of small diamonds. Various methods of mounting diamonds mechanically in core drill bits have been devised, but none of them is able to securely mount a row of diamonds in contact with each other, and all present methods of mounting are unsatisfactory because the diamonds must be spaced apart and are not always firmly gripped in the mounting and their outer edges do not always protrude equally from the mounting. Various kinds of mountings have been used but it has been very difficult to mount diamonds securely in tool steel.

In my invention diamonds or other elements are arranged in rows, and the diamonds in each row are contiguous and in contact with each other and are not spaced apart, but the rows are spaced apart with reference to each other. By this arrangement the diamonds or elements form continuous cutters or cutting edges, and the cuts made by the diamonds overlap, leaving the cut surface smooth and without ridges, thereby greatly adding to the efficiency and cutting speed of the drill bit. Upon core drill bits the rows of elements may be arranged radial or from a radial to a tangential angularity, and it is preferred that an angularity between radial and tangential be employed.

With my invention it will be apparent that the diamonds or other elements may be mounted directly in the tool or other member regardless of the material employed therein, it being understood that tool steel is preferred in most uses. Furthermore the elements may be mounted in contiguous arrangement in rows or any other desired manner so as to provide the desired cutter blades on the resulting tool.

In Figs. 1 and 2 of the drawing, the drill bit 10 is provided with a rounded or domed working end 11 in which are imbedded a plurality of diamond or other hard cutter elements 12 which are mounted in accordance with the method forming the subject matter of a companion application filed by me of like date herewith and hereinafter described, and illustrated in part in Fig. 8 of the drawing.

The elements 12 are arranged in a series of rows 13 which are spaced circumferentially around the domed end 11. The elements 12 in each row are contiguous and in contact with each other, and all the elements 12 in all the rows protrude equally from the surface of the domed end 11. The rows are not geometrically radial but are set at an angle to the true radii, so that when the bit rotates, the inner diamond is forward and the outer diamond is further to the rear. This angle is so arranged, that when the drill bit rotates in the drill hole, the sludge impinges upon the leading side of each row 13 of diamonds at a suitable angle to be deflected outwardly. As all the diamonds protrude equally from the surface 11, the end diamonds of each row protrude equally from the walls of the bit 10 as shown at 14. The outer wall of the bit 10 is preferably tapered as at 15 to provide a clear passage for the return flow of water and sludge around the drilling pipe or core-barrel partially indicated at 16 to which the bit 10 is connected. The shank portion 17 of the bit 10 opposite the domed end 11 is threaded as at 18 in the usual manner for connection with the drilling pipe or core-barrel.

In Fig. 3 of the drawing, I have shown at 20 the shank portion of a drill bit which is threaded as at 21 similar to the threaded portion 18 shown in Fig. 1 of the drawing. The other end of the shank portion 20 is a surface 22 adapted to receive a ring or crown 23 having a reduced mounting portion 24 adapted to fit upon the surface 22. The crown 23 may be attached permanently to the surface 22 of the shank portion 20, or these parts may be arranged so that the crown 23 may be attached and removed at will. In the latter case the surface 22 of the shank 20 and the mounting portion 24 of the crown 23 may both be threaded so that they may be detachably connected by being screwed together, or these parts may be detachably connected by pins, one of which is indicated at 25. A permanent connection can be obtained by riveting or welding the two parts together, or the crown 23 can be directly and immovably forged upon the shank 20 in the manner hereinafter described.

The outer portion of the crown 23 is provided with a rounded or domed working end 26 in which are imbedded the diamonds or other cutting elements 27 in a series of rows 28, mounted and arranged in the same manner as the cutting elements 12 in Figs. 1 and 2. The crown may tapered as at 29 for the same purpose as the taper 15 in Fig. 1.

In Figs. 4, 5, 6 and 7 of the drawing are shown enlarged detail views, in section, showing various forms in which the working end of the drill bit may be shaped, and illustrating a row of diamonds or other cutting elements. In Fig. 4 the elements 30 are imbedded in the drill or other mounting member 31. This member 31 corresponds to the domed end 11 of the bit 10 in Figs. 1 and 2 or the domed end 26 of the crown 23 in Fig. 3. The inner dotted line 32 indicates the outer surface of the member 31 showing its level between the rows of diamonds, and the outer dotted line 32a indicates the outer edge of the mounted diamonds showing that they protrude equally from the surface of the member. It will also be noted that the major portion of each diamond is firmly imbedded in the member, only a small portion protruding therefrom.

In Fig. 5, 31a represents a part of a drill bit which is rectangular in cross sectional form, and 30a represents the diamonds imbedded therein. The forms shown in Figs. 4 and 5 are more or less conventional, whereas Figs. 6 and 7 illustrate other forms of mounts which can be employed. In Fig. 6, 31b represents what may be termed a tapered or conical cross sectional contour, the diamonds being shown at 30b. In Fig. 7 of the drawing a beveled cross sectional form of bit is shown at 31c with the diamonds 30c imbedded therein. The forms of bit shown in Figs. 6 and 7 are more efficient due to the fact that they present a leading cutting edge engaging the substances or material being drilled, thereby easing the drilling operation.

In Fig. 8 I have indicated diagrammatically the process of forming tools of the type and kind shown in Figs. 1 to 7 inclusive, being the method more fully described in and being the subject matter of a companion application filed by me of like date herewith. In this figure, 33 represents a part of a workpiece or blank of tool steel or other suitable material, from which the resulting tool is to be formed. A die or punch is shown at 34 having an annular depression or cavity 35 in the lower portion thereof which has an appropriate cross sectional contour. In this annular depression are a series of grooves 36 at circumferentially spaced intervals. The grooves 36 are arranged at the desired angle to the radii. In each groove 36 is placed a contiguous row of diamonds or other cutting elements 37, similar to the elements 12, 27 and 30. Shellac, glue, gelatin or the like 38 may be used as a cementing substance to hold the elements 37 in position. The prepared die with the diamonds in position is now placed in the moving member of a forging press. The workpiece 33 is then heated in a suitable furnace, to a forging temperature, and while at this temperature is placed on a shank 39 and in a suitable receptacle 40 on the bed of the forging press. The die is now pressed upon the workpiece 33 and the workpiece will be forged into the desired shape 33a defined by the die 34, and at the same time the diamonds 37 will be securely imbedded in the forged tool. The cross sectional contour of the finished surface 33a can be made of any shape, such for example as shown in Fig. 4, 5, 6 or 7, by shaping the cross sectional contour of the depression 35 in the die 34 to the desired shape. The grooves 36 will control the outer edges of the diamonds 37, so that they will protrude equally from the surface 33a of the forged tool. The amount by which the diamonds 37 protrude from the surface 33a may be regulated by making the grooves 36 deeper or shallower.

If it is desired rigidly to forge a crown 23 upon a shank 20 in Fig. 3, the blank or workpiece 33 is suitably preformed as in Fig. 8 and the shank 39 and the blank 33 are both placed in a properly formed receptacle or cup 40 on the bed of the forging press. The portion 41 of the shank 39 in contact with the blank 33, may be grooved or threaded, so that upon forging, the metal of the blank 33 may be forced into these irregularities of surface to create a tight bond between the two parts.

Although I have described a diamond core drill bit, this invention is also applicable to abrasive wheel dressers or other tools where it is desired to mount diamonds or other hard substance in rows on a curved or flat surface of a metallic member or other suitable material. For these uses a single row of diamonds or other cutting elements may be imbedded in a suitably shaped member. The shape of the finished tool can be determined by the shape of the die.

For the purpose of simplifying the language of the claim it is here stated that in referring to angular arrangement of rows of the cutter elements, that reference is made to an arrangement between a true radial and substantially a tangential position on the surface of the tubular tool bit.

Having fully described my invention, what I claim as new and desire to secure by Letters Patent, is:

A diamond core drill bit comprising a tubular body, one end portion of said body being threaded for coupling with a drilling core-barrel, the other end of the wall of said body being of dome-shaped cross sectional contour, a plurality of rows of uncut diamonds imbedded in said domed end, each row being arranged at a predetermined and like angle, and the diamonds in each row being arranged in contact to form substantially continuous cutters of each row of diamonds.

AARON SIMONS.